Oct. 17, 1967 H. GHIRON 3,348,211

RETURN ADDRESS SYSTEM FOR A DATA PROCESSOR

Filed Dec. 10, 1964

INVENTOR
H. GHIRON
BY John C. Albrecht
ATTORNEY 3,348,211
Patented Oct. 17, 1967

3,348,211

RETURN ADDRESS SYSTEM FOR A DATA PROCESSOR

Hugo Ghiron, Colts Neck, N.J., assignor to Bell Telephone Laboratories, Incorporated, New York, N.Y., a corporation of New York Filed Dec. 10, 1964, Ser. No. 417,336
18 Claims. (Cl. 340—172.5)

Figure 1:
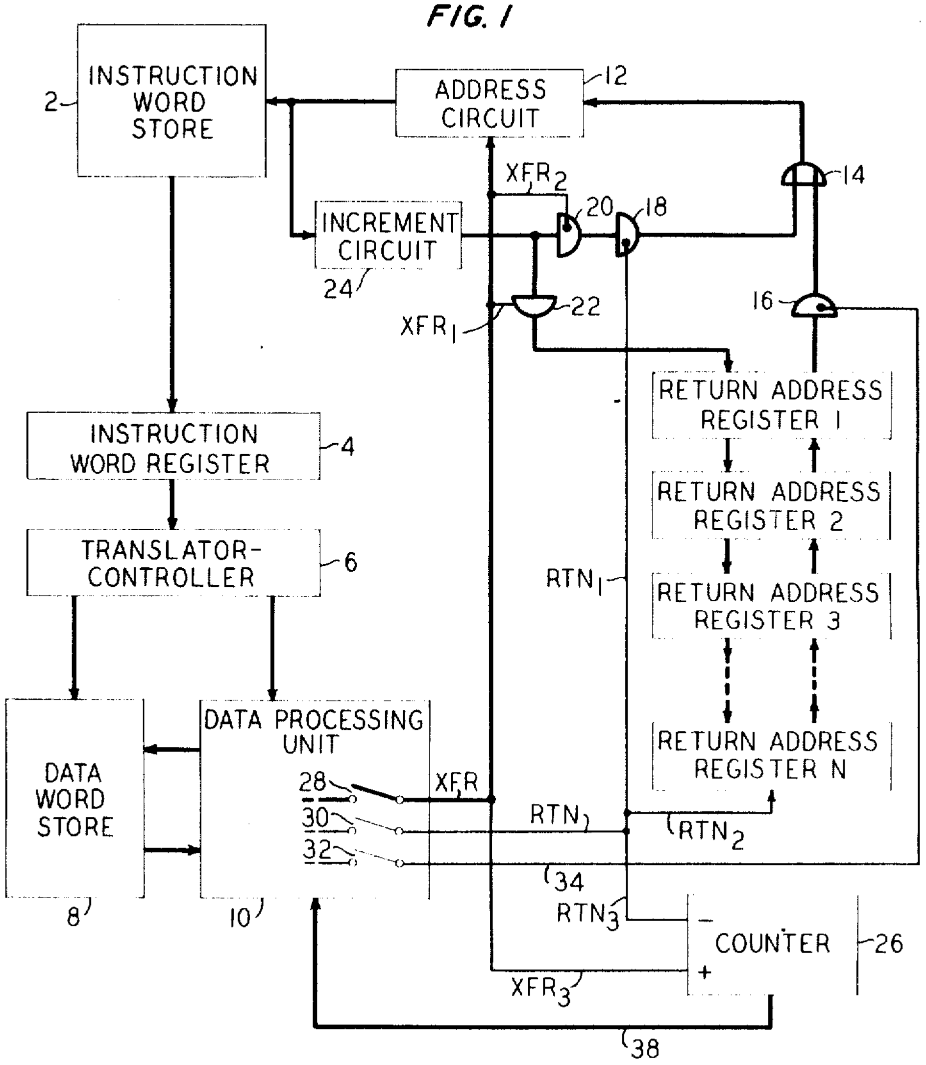

This invention relates to data processors and more particularly to transfer and return systems for use therein.

In a typical program-controlled data processor the operations performed by the machine are controlled by a sequence of instruction words. Each instruction word is stored at a memory location which is identified by a respective address. Most often instructions stored at sequentially addressed locations are used successively to control the machine operation. The instruction words may be transmitted successively from an instruction word store to an instruction word register, the particular instruction word appearing in the register controlling the instantaneous operation of the machine. An address circuit, containing the address of a location in the instruction word store, may be used to control the transmission of the respective instruction word from the instruction word store to the instruction word register. By continuously incrementing the address contained in the address circuit successively stored instruction words may be transmitted to the instruction word register.

A program subroutine may be defined as a sequence of successively addressed instructions which controls a particular data processing function. A particular subroutine may be used by many programs or other subroutines. In the course of executing an initial program or a subroutine it may therefore be necessary to transfer out of it to another subroutine. Typically, an instruction in the initial program may control a comparison operation. If the comparison is successful the machine may continue operating in accordance with the initial program. If the comparison is not successful a transfer is made to another subroutine. When this other subroutine is completed a return is made back to the initial program. The return is made to the instruction which is stored at the location whose address is the next following that of the instruction which originally controlled the transfer out of the initial program.

When the transfer out of the initial program is first accomplished it is necessary to store a return address somewhere in the system. If the return address (typically, the address of the instruction which would have been next executed were it not for the transfer) is not registered the machine cannot return to the initial program after the subroutine to which the transfer was effected is completed. For this reason conventional data processors are provided with some mechanism for storing return addresses.

Sometimes the proper return is controlled by the program itself. For example, the subroutine to which the initial transfer is made may terminate with a transfer instruction whose address is initially blank. When the initial transfer is made the return address is calculated and written in this last partially blank instruction of the subroutine. Thus after the subroutine is executed the last instruction in it controls a proper return to the initial program. This process may be continued even when multiple transfers are possible. For example, a transfer may be made from the initial program to a level 1 subroutine and in the course of executive the level 1 subroutine a transfer may be made to a level 2 subroutine. When the first transfer is made the return address in the initial program is written in the last instruction of the level 1 subroutine. When the transfer out of this subroutine is effected the return address for the level 1 subroutine is written in the last instruction of the level 2 subroutine. Thus after completion of the latter subroutine return may be made to the proper instruction in the level 1 subroutine. Finally, after the completion of the level 1 subroutine a proper return may be made to the initial program.

In systems such as the one just described the mechanism for controlling proper returns is inefficient for at least two reasons. First, before any transfer is effected it is necessary to fill in or complete the instruction word which is the last in the subroutine to which the transfer is effected. This operation, a "write" operation, generally requires a complete machine cycle and thus the machine is slowed down each time a transfer is required. Second it is not possible to transfer from one level to another, and then to another, etc., and then quickly to return to the initial program in the event the intermediate level subroutines need not be completed. For example, consider a situation in which a transfer is made from the initial program to a level 1 subroutine, a transfer is then made in the middle of the level 1 subroutine to a level 2 subroutine, etc. The last subroutine to which a transfer is made may be at level 10 (the term "level 10" merely indicates that ten transfers have been made away from the initial program). Suppose that in executing the level 10 subroutine it is determined that the level 1 through level 9 subroutines need not be completed and that the machine may instead return to the initial program. A simple return is not possible. The proper return address is contained in the level 1 subroutine but access may be gained to this subroutine only by examining the last instruction in the level 2 subroutine, which in turn requires an examination of the last instruction in the level 3 subroutine, etc. In fact, nine returns must be made in succession before a return is finally made to the initial program. In addition, when a return is made to each of the intermediate programs an additional operation is required in order that the machine skip to the last instruction in the intermediate level subroutine rather than executing it in full. For this reason additional control circuitry is often provided in a data processor to control the proper return sequence.

One such scheme is shown in the copending application of Doblmaier et al., Ser. No. 334,875, filed Dec. 31, 1963. In this system a return address (J) register is provided. When a transfer is made from one level subroutine to another the return address is stored in the register rather than being written in the last instruction of the subroutine to which the transfer is made. At the termination of the latter subroutine the return address register is examined for the proper return address in the preceding level. The provision of a return address register enables a return address to be simply stored without requiring the execution of an additional write operation. However, even in such a system it is not possible to simply store a sequence of return addresses when successive transfers are made. When the first transfer is made from the initial program to the level 1 subroutine the return address for the initial program is stored in the register. If a transfer is then made out of the level 1 subroutine to a level 2 subroutine the level 1 subroutine return address is stored in the register. The original return address in the register must be transferred and stored elsewhere. Similarly, if a transfer is made to a level 3 subroutine the level 1 return address must be stored elsewhere in the machine in order that the level 2 return address be stored in the register. When the level 3 subroutine is completed a proper return to the level 2 subroutine may be effected by examining the register for the return address. Before the level 2 subroutine is executed however the level 1 return address which was previously transferred from the register to elsewhere in the machine must be retrieved and placed in the register. In this manner at the end of the level 2 subroutine the register may be examined for the level 1 return address. Finally when a return is made to level 1 the initial program return address must be retrieved and placed in the register in order that a proper return to the initial program be made when the level 1 subroutine is completed. Thus even in systems providing a return address register it may be necessary to execute additional instructions to control the proper sequence of returns. In addition, it is not possible to simply return from a high level subroutine to the initial program because all of the intermediate return addresses must be examined in sequence before the original return address is identified.

It is a general object of this invention to provide an improved transfer and return system for a data processor.

It is another object of this invention to provide a transfer and return system in which it is not necessary to execute additional instructions to control a proper return sequence even when successive transfers are made from one level subroutine to another.

It is another object of this invention to provide a transfer and return system in which it is possible to rapidly gain access to a return address without requiring returns to intermediate level subroutines.

Briefly, in accordance with an aspect of my invention, a series of return address registers 1 through N is provided. Whenever a transfer is made out of one level the respective return address is stored in address register 1. Whenever a return address is stored in register 1 the previous contents of this register are shifted down to register 2, the previous contents of register 2 are shifted down to register 3, etc. Thus the return address of the preceding level always appears in register 1. At the termination of any subroutine, level 1 is examined for a return address. This address is of necessity the one in the next lower level to which the return is required. Whenever a return is made the addresses in all of the address registers are shifted up one level. The return address in register 1, which is used to control the return, is shifted out of the address register system, and the return address previously in register 2 appears in register 1. This address identifies the instruction in the next lower level subroutine to which the next return is to be effected. Again it is only necessary to examine register 1 for the proper return address. By shifting the return addresses stored in the register system up and down in this manner it is possible to control the proper return sequence without executing additional instructions each time a transfer or a return is made.

It is also possible to skip over intermediate level subroutines in returning to a lower level. It is only necessary to shift the return addresses stored in the register system up the proper number of times until the desired return address is in register 1. At this time register 1 is examined and the proper return is made.

In many applications it is not known initially how many intermediate levels exist between the initial program and the subroutine presently being executed. This is due to the fact that a variety of transfer sequences from the initial program to the subroutine now being executed may be possible. In such a case it may not be known how many shifts are required to place the initial return address in register 1. For this reason, in accordance with an aspect of my invention, I provide a counter which is incremented each time a new address is stored in register 1 and which is decremented each time an address is returned to register 1 from register 2. The counter thus contains the number of return addresses stored in the address register system. By examining the counter it is possible to determine the proper number of shifts required in order to place the initial return address in register 1 to control a return back to the initial program independent of the number of intermediate transfers which have taken place since the original transfer out of this program.

It is a feature of this invention to provide a group of serially connected return address registers, the contents of each register being shifted to the adjacent register away from the first register in the series each time a new return address is stored in the first register and the contents of each register being shifted to the adjacent register toward the first register each time the first register is examined for a return address.

It is another feature of this invention to store a return address in the first register each time a transfer out of one subroutine to another is made.

It is another feature of this invention to examine the first register for a return address each time a return to a subroutine is required.

It is another feature of this invention to provide means to rapidly shift the contents of all of the registers to the respective adjacent registers toward the first register a number of times in succession for controlling a return to a subroutine while skipping over intermediate return addresses stored in the registers.

It is still another feature of this invention to provide a counter which is incremented each time a return address is stored in the first register and decremented each time the contents of the registers are shifted toward the first register, the counter thus representing the total number of return addresses stored in the registers.

Further objects, features and advantages of the invention will become apparent upon consideration of the following detailed description in conjunction with the drawing in which:

FIG. 1 discloses an illustrative embodiment of my invention; and

Figure 2:
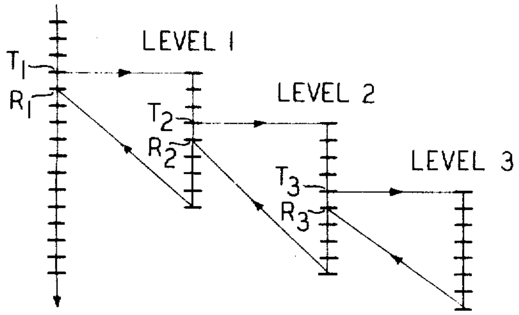

FIG. 2 illustrates the type of data processing transfer and return sequence to which the illustrative embodiment of the invention is directed.

In FIG. 1 various elements of data processors well known in the art but not necessary for an understanding of my invention, such as timing circuitry, have been omitted. Further, as various ones of the functional blocks depicted perform known and recognized operations, the details of such circuitry have not been shown. A specific data processor in which my invention may advantageously be employed is the above-identified Doblmaier et al. application, and such disclosure is hereby incorporated herein.

Instruction word store 2 contains the instruction words used for controlling the machine operation. Although data word store 8 is shown as a separate unit it is of course to be understood that the two stores may be one and the same. Instruction words are transmitted one at a time to instruction word register 4. Translator-controller 6 interprets each instruction word and controls the operation of data processing unit 10 and data word store 8. The data word store and data processing unit are interconnected and the combined operations of the two are controlled in accordance with the particular order being executed.

The particular instruction which is transmitted to the instruction word register is determined by the address contained in address circuit 12. The address contained in this circuit is transmitted not only to instruction word store 2 but to increment circuit 24 as well. The increment circuit adds the number 1 to the address in the address circuit and transmits the incremented value through normally enabled gates 20 and 18 and OR gate 14 to the address circuit. The new incremented address now controls the transmission of the next successively stored instruction in store 2 to the instruction word register.

When it is desired to transfer to an out-of-sequence instruction, data processing unit 10 controls the application of signals representing the new address to cable XFR. This cable, as well as various others in the drawing, is shown by a heavy line to indicate that many signals are transmitted over it simultaneously. (The various gates in the drawing are also shown by heavy lines. Each of these gates actually represents a series of gates for controlling the transmission of respective bits in an address. While the gates will be referred to in the singular throughout this description it is to be borne in mind that each gate is capable of controlling the transmission of all of the bits in an address.) The application of the out-of-sequence address to cable XFR is shown symbolically by switch 28. The actual signals applied to the cable are determined by the operation of data processing unit 10. Switch 28 merely symbolizes the initiation of the transfer operation. The details of the data processing unit are not necessary for an understanding of the present invention.

Cable XFR in addition to containing conductors for carrying the bits in the new address also contains three conductors $XFR_1$, $XFR_2$ and $XFR_3$. These conductors are for control purposes and are originally unenergized. When a transfer is to be made they are all energized. The energization of conductor $XFR_2$ causes normally enabled gate 20 to turn off. The incremented address derived by increment circuit 24 is no longer transmitted through gate 20 to address circuit 12. Instead the new address on cable XFR is written in the address circuit.

Before proceeding to the description of the remainder of the circuitry of FIG. 1 it will be helpful to examine FIG. 2 for the purpose of understanding the transfer and return sequence with which the illustrative embodiment of the invention is concerned. The leftmost vertical line represents a sequence of instructions in the initial program being executed by the machine. Each bar on the line represents another instruction. In the course of executing the initial program address $T_1$ is stored in address circuit 12 and the respective instruction is transmitted to the instruction word register. This instruction controls the transfer of the machine to a level 1 subroutine. This subroutine is a sequence of instructions represented by the second leftmost vertical line. The successive instructions in the subroutine are transmitted to the instruction word register until the subroutine is completed. At this time, assuming that a transfer out of the level 1 subroutine has not been effected, a return must be made to the instruction stored at address $R_1$, this instruction being the one following the last one in the initial program which was executed. When a transfer is made out of the initial program to the level 1 subroutine the address $R_1$ must be stored somewhere in the machine in order that a return be made to the proper instruction at the termination of the level 1 subroutine.

In the course of executing the level 1 subroutine it is possible that another transfer may be required. The transfer may always be required when the level 1 subroutine is executed or may be necessary only under certain conditions. In either event if a transfer is required to a level 2 subroutine, shown by the third leftmost vertical line, the return address $R_2$ must be stored somewhere in the machine. $R_2$ equals $T_2+1$ and is the address of the instruction which must be executed when a return is made back to the level 1 subroutine. (It is also possible in some machines for $R_2$ to be other than $T_2+1$. The return address may be a function of the transfer test itself. While in the illustrative embodiment of the invention the return address is always the one immediately following the address of the instruction which controls the transfer, the principles of the invention are equally applicable to more sophisticated systems in which the return address may be controlled.) When the transfer is made out of the level 1 subroutine to the level 2 subroutine return address $R_2$ must be stored somewhere in the machine for subsequent use.

Similarly, before the level 2 subroutine is finished a transfer may be made to a level 3 subroutine. In such a case return address $R_3$ must be stored in the machine for subsequent use. When the level 3 subroutine is finished a return is made to the instruction stored at address $R_3$.

This address is stored in address circuit 12 in FIG. 1 and increment circuit 24 controls the continuous incrementing of this address until the level 2 subroutine is also terminated. The last instruction in the subroutine controls a return to the instruction stored at address $R_2$. Address $R_2$ is now placed in address circuit 12 and it is this address which is incremented until the level 1 subroutine is finished. The last instruction in the level 1 subroutine controls a return to the instruction stored in address $R_1$ in order that the initial program be continued. The invention is concerned with the storage of the successive return addresses $R_1$, $R_2$, $R_3$, etc., rapid access to them and various manipulations with them.

In FIG. 1 return address registers 1–N initially contain no return addresses. When switch 28 is first operated the address on cable XFR which is written directly in address circuit 12 is the address of the first instruction in the level 1 subroutine. The output of increment circuit 24 is the return address $R_1$ since the increment circuit increments the address $T_1$ whose associated instruction controls the transfer in the first place. Since conductor $XFR_2$ is energized and gate 20 in inhibited from operating, address $R_1$ is not transmitted to address circuit 12. The operation of switch 28 however controls the energization of conductor $XFR_1$ and the operation of gate 22. Return address $R_1$ is thus directed to and stored in return address register 1. Whenever a return address is stored in register 1 the previous contents of register 1 are shifted down to register 2, the previous contents of register 2 are shifted down to register 3, etc. Initially all of the registers contain no return addresses. When $R_1$ is stored in register 1 the other registers still contain no return addresses since each of these registers receives the contents of the register directly above which previously did not contain a return address.

The level 1 subroutine is then executed because increment circuit 24 controls the continous incrementing of the first address in the level 1 subroutine. Assuming that a transfer out of the level 1 subroutine is not required this subroutine continues until it is finished. When the data processing unit 10 determines that a return to the initial program is required switch 30 is operated and conductor RTN is energized. This conductor is in turn connected to conductors $RTN_1$, $RTN_2$ and $RTN_3$. The energization of conductor $RTN_1$ controls the inhibiting of normally enabled gate 18. The output of increment circuit 24, the address of the instruction following the last one in the level 1 subroutine, which address is not required, is not directed to address circuit 12. Nor is it directed to return address register 1 since gate 22 is only enabled when conductor $XFR_1$ is energized. The output of increment circuit 24 is directed nowhere since it is not required. Conductor $RTN_2$ is connected to return address register N. When this conductor is pulsed the return address, if any, stored in register N is shifted up to return address register N–1, not shown in the drawing. Similarly, the contents of register N–1 are shifted up one step, etc. Since registers 2 through N contain no return address and the contents of these registers are all shifted up one step after the return operation registers 1 through N–1 are still blank. Similarly, since nothing is written into register N this register is also blank. The net effect of the operation of switch 30 is that address $R_1$ previously stored in return address register 1 is shifted up through normally enabled gate 16 and OR gate 14 to address circuit 12. Since address $R_1$ is thus stored in the address circuit the initial program continues as required.

Suppose however that in the course of executing the level 1 subroutine a transfer is required to a level 2 subroutine. Switch 28 is operated and the address stored in address circuit 12 is that of the first instruction in the level 2 subroutine. The output of increment circuit 24 is return address $R_2$ and because conductor $XFR_1$ is energized address $R_2$ is directed to return address register 1. Return address $R_1$ is shifted down to register 2. Return address $R_2$ is maintained in register 1. If a transfer out of the level 2 subroutine is not required at the termination of it switch 30 is operated and all of the return addresses stored in the register system are shifted up one step. $R_2$, previously stored in register 2, is shifted up to register 1, and $R_1$, previously stored in register 1, is directed to address circuit 12. The level 1 subroutine is then finished. At the termination of it switch 30 is operated once again. Since $R_1$ is now in register 1, it is $R_1$ which is now shifted up to address circuit 12 and the proper return to the initial program is made.

Similarly, if a transfer to a level 3 subroutine is required when switch 28 operates for the third time in succession before the operation of switch 30 the output of increment circuit 24, return address $R_3$, is directed to register 1. $R_2$ is shifted down to register 2 and $R_1$ is shifted down to register 3. At the termination of the level 3 subroutine switch 30 is operated, $R_1$ is shifted up to register 2, $R_2$ is shifted up to register 1, and $R_3$ is directed to address circuit 12 to control the completion of the level 2 subroutine. At the termination of the level 2 subroutine switch 30 is operated once again, $R_1$ is shifted up to register 1, and $R_2$ is directed to address circuit 12 to control the completion of the level 1 subroutine. When switch 30 is operated for the third time, return address $R_1$ is directed from register 1 to address circuit 12 and the proper return to the initial program is made.

The number of return address registers which must be provided in any system depends on the maximum number of transfers which are possible away from an initial program. The provision of the return address registers is highly advantageous for the following reason. Whenever a transfer is made the return address is always stored in the same register, namely return address register 1. Whenever a return is required the same register may be examined for the proper return address. Additional programming is not required to control proper returns. The proper return address always appears in the same register, namely register 1. The up and down shifting of the return addresses in the register system insures that the address of the instruction to which the return is required always appears in register 1 and is gated to address circuit 12 by the operation of switch 30. When a transfer is first made out of a subroutine it is not necessary to write the return address in the last instruction of the subroutine to which the transfer is effected. All return addresses are simply written in return address register 1. The return itself is also simpler than those ordinarily encountered in prior art systems. When the data processing unit determines that a return is required switch 30 is operated and the proper address is transmitted directly from register 1 to address circuit 12.

Many times it may be necessary to transfer back to a lower level subroutine while skipping over the instructions in the intermediate levels. For example, suppose that in the course of executing a level 3 subroutine it is determined that it is no longer necessary to complete the level 2 subroutine and that instead a return may be made to the level 1 subroutine. In the illustrative embodiment of the invention it is possible to return directly to $R_2$ from the level 3 subroutine. If data processing unit 10 determines that a return must be made to the level 1 subroutine all that is required is that switch 30 be operated twice in succession and switch 32 be operated during the first operation of switch 30. When switch 30 is operated the first time $R_1$ is shifted from register 3 to register 2, $R_2$ is shifted from register 2 to register 1, and $R_3$ is shifted from register 1 to the input of gate 16. Ordinarily $R_3$ would be transmitted through this gate and OR gate 14 to address circuit 12. But with switch 32 operated, normally enabled gate 16 is inhibited from operating and $R_3$ is not transmitted to address circuit 12. When switch 30 is operated the second time $R_1$ is shifted from register 2 to register 1 and $R_2$ is shifted from register 1 to the input of gate 16. Switch 32 is not operated when switch 30 is operated the second time. Consequently $R_2$ is transmitted through the gate to address circuit 12. Thus a return may be made rapidly to a lower level subroutine merely by operating switch 30 a number of times in succession, the number depending on the number of intermediate level subroutines to be skipped over, with switch 32 being operated together with switch 30 each time except the last. As contrasted with prior art systems it is not necessary to return to the intermediate level sub-routines to gain access to the final return address desired. It is only necessary to operate switch 30 the required number of times in succession.

It is possible to operate switches 30 and 32 in the manner just described to control a return to a predetermined subroutine when it is known how many intermediate levels separate the subroutine just finished and the one to which the return is desired. However it is some times possible that the data processing unit will not know in advance the number of these intermediate levels. This situation may arise when there are more than one sequence of intermediate level subroutines which may separate two given levels. For example, suppose that when a level 1 subroutine is being executed it is possible to transfer to either program A or B, both subroutines thus being in "level 2." From subroutine A transfers may be possible to subroutines C, D, E and F in sequence, subroutine F thus being a level 6 subroutine. From subroutine B it is possible to transfer to subroutine G and then to subroutine F, F being a level 4 program in this case. In either situation it may be determined in subroutine F that a return is required to level 1. In the first case switch 30 must be operated five times in succession and in the second it must be operated only three times. Return address $R_2$ is stored in either the fourth or the sixth return address registers but the data processing unit may not know in which of the two registers $R_2$ is stored. For this reason counter 26 is provided.

The counter is provided with two inputs. When conductor $XFR_3$ is pulsed the count in the counter is incremented. When conductor $RTN_3$ is pulsed the count in the counter is decremented. Conductor $XFR_3$ is pulsed whenever switch 28 operates and a transfer takes place. Conductor $RTN_3$ is pulsed whenever switch 30 operates and a return is made. Thus the count of counter 26 represents the excess of the number of transfers over the number of returns, i.e., the total number of returns required for the machine to return to the initial program. The level of the subroutine being executed is thus determined by the contents of the counter. Cable 38 connects the counter to data processing unit 10 and enables the latter unit to determine the total number of return addresses stored in the register system. If it is necessary to return to the initial program data processing unit 10 controls switch 30 to operate a number of times equal to the count contained in the counter. If, for example, a return is required to the second level subroutine and the count in the counter is 7, switch 30 is operated five times in succession. In such a case when the return is made $R_2$ appears in register 1, $R_1$ appears in register 2 and the count of the counter is 2. The counter enables the data processing unit to identify the level of the subroutine being executed and in this manner, if the level of the subroutine to which the return is desired is known, a return may be made even though the data processing unit has no record of the number of intermediate levels separating the desired subroutine level from that of the subroutine being executed at the time when the decision to return is made.

Although the invention has been described with reference to a specific embodiment it is to be understood that this embodiment is only illustrative of the application of the principles of the invention. Various modifications may be made therein and other arrangements may be devised without departing from the spirit and scope of the invention.

What is claimed is:

1. A data processor comprising a memory containing a plurality of instructions, each of said instructions being contained at a respective address in said memory, means for representing an instruction to control a data processing operation, means for transmitting successively addressed instructions to said instruction representing means, a plurality of registers arranged in ascending order of significance, said register storing return addresses only, first means for controlling said transmitting means to transmit an instruction whose address is out of sequence, means for storing a return address in the most significant one of said registers when an out-of-sequence instruction is transmitted to said instruction representing means and for shifting all return addresses stored in said registers to the respective succeeding registers of lesser significance, second means for controlling said transmitting means to transmit the instruction at the address contained in said most significant register, and means for shifting all return addresses stored in said registers to the respective succeeding registers of higher significance responsive to the operation of said second controlling means.

2. A data processor in accordance with claim 1 further including means for deriving successive addresses for said transmitting means, said storing means storing an address derived by said last-mentioned means in the most significant one of said registers when an out-of-sequence instruction is transmitted to said instruction representing means.

3. A data processor in accordance with claim 1 wherein said last-mentioned means is operable more than once in succession for controlling the shifting of all of the return addresses stored in said registers to the respective registers of higher significance to place a selected return address stored in one of the registers of lower significance in said most significant register.

4. A data processor in accordance with claim 3 further including counting means, means for incrementing the count in said counting means whenever a return address is stored in said most significant register, and means for decrementing the count in said counting means whenever the return addresses in said registers are shifted to the respective succeeding registers of higher significance.

5. A data processor comprising a memory storing a plurality of instructions, each of said instructions being stored at a respective address in said memory; means for representing an instruction to control a data processing operation; an address circuit containing an address for controlling the transmission of the respective instruction to said representing means; means for incrementing the address contained in said address circuit and normally operative to store the incremented address in said address circuit; a plurality of registers arranged in sequence; means for writing an address in said address circuit, for inhibiting the storage of the incremented address normally stored in said address circuit, and for storing said incremented address in a first one of said registers; means for shifting the addresses stored in said registers to respective adjacent registers whenever an address is first stored in said first register; means for directing the address contained in said first register to said address circuit and for inhibiting the storage of the incremented address normally stored in said address circuit; and means for shifting all of the addresses stored in said registers to the respective adjacent registers out of which the addresses in said registers were originally shifted.

6. A data processor in accordance with claim 5 wherein said directing and inhibiting means is operable a number of times in succession and further including means for selectively controlling the storage in said address circuit of the address directed to said address circuit.

7. A data processor in accordance with claim 5 further including means for representing the total number of addresses contained in said plurality of registers.

8. A data processor comprising a memory containing a plurality of instructions, each of said instructions being stored at a respective address in said memory; means for representing an address; means for performing a data processing operation in accordance with the instruction whose respective address is represented in said representing means; means for incrementing the address in said representing means; means for inhibiting the operation of said incrementing means and for causing a new address to be written in said representing means; a memory system including means defining a plurality of locations for storing only return addresses; means for storing a return address in a first one of said locations each time a new address is written in said representing means; means for storing the return address stored in said first location in another of said locations each time a new return address is stored in said first location; and means for inhibiting the operation of said incrementing means, for writing the return address contained in said first location in said representing means, and for storing a return address contained in another of said locations back in said first location.

9. A data processor in accordance with claim 8 wherein the return address stored by said storing means in said first location each time a new address is written in said representing means is the incremented value of the address previously represented in said representing means.

10. A data processor in accordance with claim 8 further including counting means, means for incrementing the count in said counting means whenever a return address is first stored in said first location, and means for decrementing the count in said counting means whenever a return address contained in another of said locations is restored back in said first location.

11. A data processor comprising a memory containing a plurality of instructions, each of said instructions being stored at a respective address in said memory; means for representing an address; means for performing a data processing operation in accordance with the instruction whose respective address is represented in said representing means; means for incrementing the address in said representing means; means for inhibiting the operation of said incrementing means and for causing a new address to be written in said representing means; a memory system including means defining a plurality of locations for storing return addresses; means for sequentially storing return addresses in said locations responsive to the writing of new addresses in said representing means; and means for inhibiting the operation of said incrementing means and for sequentially writing the return addresses contained in said locations in said representing means in the reverse order in which said return addresses were stored in said locations.

12. A data processor in accordance with claim 11 further including means for determining the total number of return addresses stored in said plurality of locations.

13. A data processor comprising a memory containing a plurality of instructions, each of said instructions being stored at a respective address in said memory; means for representing an address; means for performing a data processing operation in accordance with the instruction whose respective address is represented in said representing means; means normally operative for controlling the address represented in said representing means to be dependent upon the address previously represented in said representing means; means for inhibiting the operation of said controlling means and for causing an independent address to be written in said representing means; a memory system including means defining a plurality of locations for storing addresses; means for sequentially storing addresses in said locations responsive to the writing of new addresses in said representing means; and means for inhibiting the operation of said controlling means and for sequentially writing the addresses contained in said locations in said representing means in the reverse order in which said addresses were stored in said locations.

14. A data processor in accordance with claim 13 further including means for determining the total number of addresses stored in said plurality of locations.

15. A data processor comprising a memory containing a plurality of instructions, each of said instructions being stored at a respective address in said memory; means for controlling the operation of the data processor in accordance with successively addressed instructions, a plurality of means defining locations for storing return addresses; means for governing said controlling means to control the operation of the data processor in accordance with successive instructions the first of which is out of sequence and for writing a return address in a first one of said locations, said return address being the address of the instruction in accordance with which the operation of the data processor would otherwise have been controlled but for the operation of said governing means; means for storing the return address stored in said first location in another of said locations each time a new return address is stored in said first location; and means for causing said controlling means to control the operation of the data processor in accordance with successive instructions beginning with the instruction stored at the address contained in said first location and for restoring a return address contained in another of said locations back in said first location.

16. A data processor in accordance with claim 15 further including means for representing the total number of return addresses stored in said plurality of locations.

17. A data processor comprising a memory containing a plurality of instructions, each of said instructions being stored at a respective address in said memory; means for controlling the operation of the data processor in accordance with successively addressed instructions; a plurality of means defining locations for storing return addresses only; means for governing said controlling means to transfer to an instruction which is out of sequence and for writing a return address in said plurality of locations; and means for causing said controlling means to transfer to the instructions at said stored return addresses in the reverse order in which said return addresses were stored in said plurality of locations.

18. A data processor in accordance with claim 17 further including means for enabling said controlling means to transfer to the instruction at a selected return address stored in said plurality of locations without transferring to instructions at return addresses stored in said plurality of locations subsequent to the storage of said selected return address.

References Cited

UNITED STATES PATENTS

| | | | |
|---|---|---|---|
| 3,064,895 | 11/1962 | Heineck et al. | 235—157 |
| 3,153,225 | 10/1964 | Merner et al. | 340—172.5 |

ROBERT C. BAILEY, *Primary Examiner.*

O. E. TODD, *Assistant Examiner.*